US009152116B2

(12) United States Patent
Yamazaki

(10) Patent No.: US 9,152,116 B2
(45) Date of Patent: Oct. 6, 2015

(54) PRINTING APPARATUS

(75) Inventor: Masataka Yamazaki, Kuwana (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 639 days.

(21) Appl. No.: 12/967,568

(22) Filed: Dec. 14, 2010

(65) Prior Publication Data

US 2011/0157617 A1 Jun. 30, 2011

(30) Foreign Application Priority Data

Dec. 28, 2009 (JP) ................................ 2009-298187

(51) Int. Cl.
*G06K 15/00* (2006.01)
*G03G 15/00* (2006.01)

(52) U.S. Cl.
CPC .......... *G03G 15/553* (2013.01); *G03G 15/5087* (2013.01); *G03G 15/55* (2013.01)

(58) Field of Classification Search
None
See application file for complete search history.

(56) References Cited

U.S. PATENT DOCUMENTS

| | | | | |
|---|---|---|---|---|
| 6,972,857 | B2 * | 12/2005 | Mantell et al. | 358/1.14 |
| 7,193,741 | B2 * | 3/2007 | Nozaki | 358/1.16 |
| 2001/0043258 | A1 | 11/2001 | Ohki | |
| 2005/0276619 | A1 | 12/2005 | Taguchi et al. | |
| 2006/0275057 | A1 * | 12/2006 | Suzuki | 399/301 |
| 2007/0216937 | A1 * | 9/2007 | Tsutsumi | 358/1.15 |
| 2008/0055660 | A1 | 3/2008 | Tsuzuki | |
| 2008/0266587 | A1 * | 10/2008 | Mita | 358/1.9 |
| 2009/0080006 | A1 | 3/2009 | Aoki | |
| 2009/0190947 | A1 * | 7/2009 | Kushida | 399/72 |
| 2009/0284770 | A1 * | 11/2009 | Nagayama et al. | 358/1.9 |

FOREIGN PATENT DOCUMENTS

| | | |
|---|---|---|
| JP | 2000-155453 | 6/2000 |
| JP | A-2001-103203 | 4/2001 |
| JP | A-2002-229278 | 8/2002 |

(Continued)

OTHER PUBLICATIONS

Notification of Reasons for Refusal dated Oct. 20, 2011 received from the Japanese Patent Office from related Japanese Application No. 2009-298187, together with an English-language translation.

(Continued)

*Primary Examiner* — Vincent Rudolph
*Assistant Examiner* — John Wallace
(74) *Attorney, Agent, or Firm* — Scully, Scott, Murphy & Presser P.C.

(57) ABSTRACT

A printing apparatus including: a plurality of reception units, wherein at least one of the plurality of reception units receives a printing job; a printing unit that performs printing based on the printing job received by the at least one of the plurality of reception units; a determination unit that determines a difficulty level of reprinting based on which of the plurality of reception units received the printing job; a setting unit that sets a correction-performing condition based on the determined difficulty level of reprinting, wherein the correction-performing condition becomes easier to satisfy as the determined difficulty level of reprinting increases; and a correction unit that performs a correcting process by causing the printing unit to form a pattern and by correcting an image to be printed based on a result of measuring the pattern, if the correction-performing condition is satisfied when the printing job is received.

2 Claims, 8 Drawing Sheets

(56) References Cited

FOREIGN PATENT DOCUMENTS

| | | |
|---|---|---|
| JP | 2005-62414 | 3/2005 |
| JP | A-2006-259068 | 9/2006 |
| JP | A-2008-060931 | 3/2008 |
| JP | A-2008-72619 | 3/2008 |
| JP | A-2008-298867 | 12/2008 |
| JP | A-2009-80157 | 4/2009 |

OTHER PUBLICATIONS

Decision of Patent Grant dated May 22, 2012 received from the Japanese Patent Office from related Japanese Application No. 2009-298187, together with an English-language translation.

* cited by examiner

PRINTING APPARATUS

CROSS-REFERENCE TO RELATED APPLICATIONS

This application claims priority from Japanese Patent Application No. 2009-298187 filed on Dec. 28, 2009, the entire contents of which are incorporated herein by reference.

TECHNICAL FIELD

Aspects of the present invention relate to a printing apparatus, and more particularly, to a printing apparatus having a function of correcting position and density of an image.

BACKGROUND

There has been proposed a related-art printing apparatus having a function of correcting position and density of an image. When receiving a printing job, such a related-art printing apparatus carries out a correcting process by determining whether or not a certain condition to perform a correcting process is satisfied, e.g. whether or not the number of print pages that was printed out throughout a previous correcting process reaches a certain value, or the like, and if it is determined YES, performs a correcting process. In the correcting process, a print unit prints a certain pattern, measures the pattern, and corrects position and density of an image based on a result of measuring the pattern. By executing a printing job after the correcting process, high quality image can be ensured.

Meanwhile, since the correct process also leads to disadvantages such as an increase in consumption of a print toner and an increase in a user's waiting time, it is unfavorable to perform the correcting process frequently. However, the user likely to become more dissatisfied to quality of a printed image as the period during which the correcting process is not performed becomes longer.

In such a case, a user can obtain a high quality image by instructing the related-art printing apparatus to perform a correcting process and by reprinting a corrected image after the correcting process. However, such reprinting may be difficult to perform or may be troublesome according to situations. In the related-art, convenience for the user according to such situations was not considered.

SUMMARY

Accordingly, it is an aspect of the present invention to provide a printing apparatus that is capable of improving convenience for the user in performing a reprinting process under situations that the reprinting process is difficult to perform or is troublesome.

According to an aspect of the present invention, there is provided an printing apparatus comprising: a plurality of reception units, wherein at least one of the plurality of reception units receives a printing job; a printing unit that performs printing based on the printing job received by the at least one of the plurality of reception units; a determination unit that determines a difficulty level of reprinting based on which of the plurality of reception units received the printing job; a setting unit that sets a correction-performing condition based on the determined difficulty level of reprinting, wherein the correction-performing condition becomes easier to satisfy as the determined difficulty level of reprinting increases; and a correction unit that performs a correcting process by causing the printing unit to form a pattern and by correcting an image to be printed based on a result of measuring the pattern, if the correction-performing condition is satisfied when the printing job is received.

According to another aspect of the present invention, there is provided a printing apparatus comprising: a reception unit that receives a printing job; a printing unit that performs printing based on the printing job received by the reception unit; a reprinting unit that is capable of performing a reprinting process for reprinting an image printed by the printing unit based on a command from a user; a determination unit that, if the reprinting process by the reprinting unit cannot be performed, determines a difficulty level of reprinting to be higher than the difficulty level of reprinting when the reprinting process can be performed; a setting unit that sets a correction-performing condition to be easier to be satisfied when the difficulty level determined by the determination unit is higher than the difficulty level of reprinting when the reprinting process can be performed; and a correction unit that performs a correcting process by causing the printing unit to form a pattern and by correcting an image which is to be printed based on a result of measuring the pattern, if the correction-performing condition is satisfied when the printing job is received.

According to another aspect of the present invention, there is provided a printing apparatus comprising: a reception unit that receives a printing job; a printing unit that performs printing using a consumable print material based on the printing job received by the reception unit; a detection unit that detects the amount of consumable print material remaining; a determination unit that determines a difficulty level of reprinting based on the amount of consumable print material remaining, wherein the determined difficulty level of reprinting increases as the amount of consumable print material remaining decreases; a setting unit that sets a correction-performing condition based on the determined difficult level of reprinting, wherein the correction performing condition becomes easier to satisfy as the determined difficulty level of reprinting increases; and a correction unit that performs a correcting process by causing the printing unit to form a pattern and by correcting an image which is printed based on a result of measuring the pattern, if the correction-performing condition is satisfied when the printing job is received.

According to another aspect of the present invention, there is provided a printing apparatus comprising: a plurality of reception units, wherein at least one of the plurality of reception units receives a printing job; a printing unit that performs printing based on the printing job received by the at least one of the plurality of reception units; a modifying unit that modifies a difficulty level of satisfying a correction-performing condition based on which reception unit receives the printing job; and a correction unit that performs a correcting process by causing the printing unit to form a pattern and by correcting an image which is printed based on a result of measuring the pattern, if the correction-performing condition is satisfied when the printing job is received.

According to another aspect of the present invention, there is provided a printing apparatus comprising: a reception unit that receives a printing job; a printing unit that performs printing based on the printing job received by the reception unit; a reprinting unit that is capable of performing a reprinting process for reprinting an image printed on the printing unit based on a command from a user; a modifying unit that, if the reprinting process by the reprinting unit cannot be performed, modifies a correction-performing condition to be easier than the correction-performing condition when the reprinting process can be performed; and a correction unit that performs a correcting process by causing the printing unit to form a pattern and by correcting an image which is printed based on a result of measuring the pattern, if the correction-performing condition is satisfied when the printing job is received.

According to another aspect of the present invention, there is provided a printing apparatus comprising: a reception unit that receives a printing job; a printing unit that performs printing using a consumable print material based on the printing job received by the reception unit; a detection unit that detects the amount of consumable print material remaining; a modifying unit that modifies a correction-performing condition based on the amount of consumable print material remaining, wherein correction-performing condition becomes easier to satisfy as the amount of consumable print material remaining decreases; and a correction unit that performs a correcting process by causing the printing unit to form a pattern and by correcting an image which is printed based on a result of measuring the pattern, if the correction-performing condition is satisfied when the printing job is received.

DETAILED DESCRIPTION OF EXEMPLARY EMBODIMENTS

First Exemplary Embodiment

The first exemplary embodiment will now be described with reference to FIGS. 1 to 5.

Overall Configuration of Printer

Figure 1:
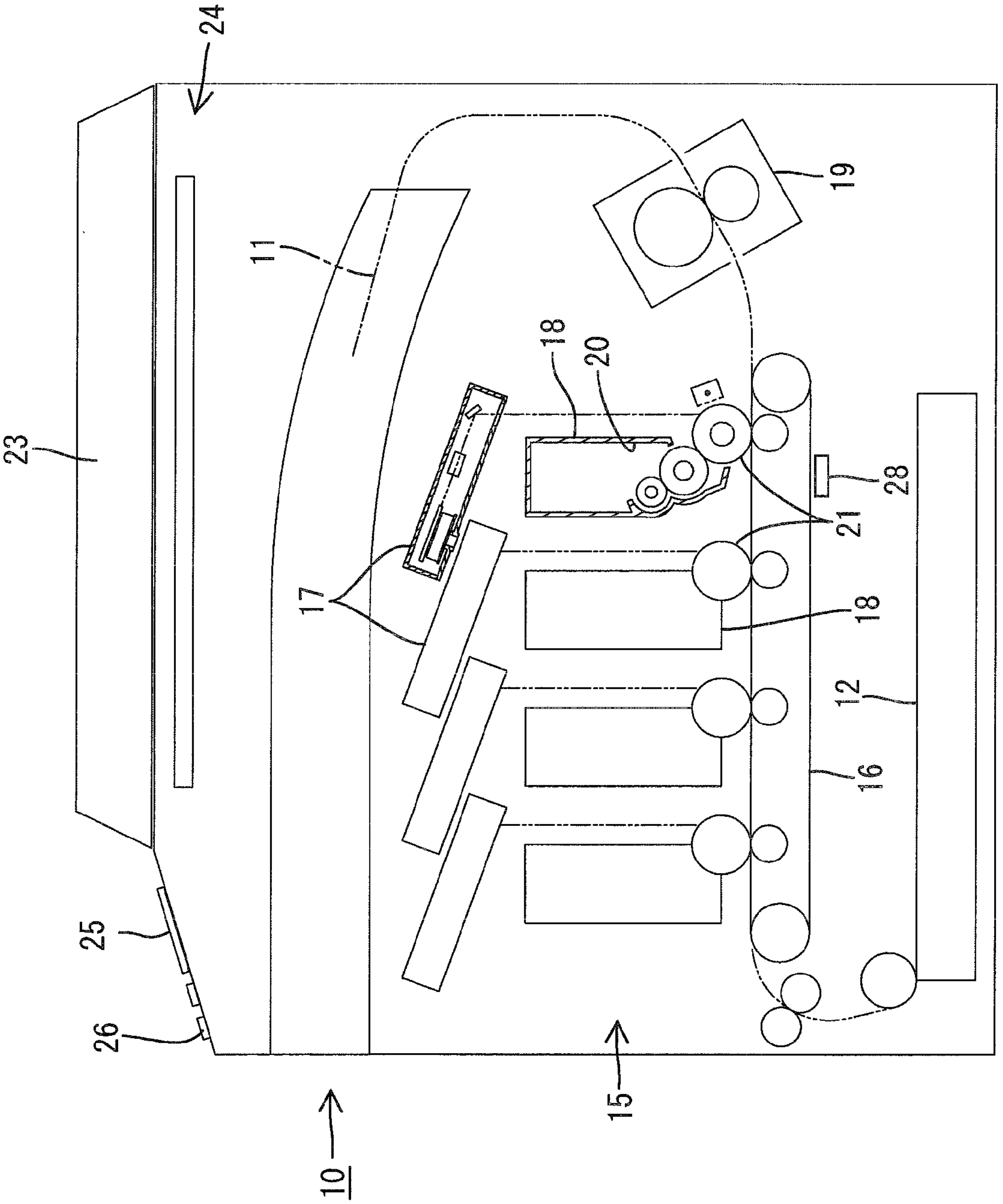
FIG. 1 is a side cross-sectional view illustrating the schematic configuration of a printer according to a first exemplary embodiment of the present invention.

FIG. 1 is a side cross-sectional view of a printer 10 which is an example of a printing apparatus of the invention. The printer 10 is a color combined machine having a function such as printing, scanning, copying, faxing, and the like.

The printer 10 includes a feed tray 12, which can store paper sheets 11 (an example of consumable print materials) therein, and from which the paper sheet 11 is fed to a printing unit 15. The printing unit 15 (an example of printing unit) includes a conveyor belt 16, four light-emitting units 17, four processing units 18, and a fuser 19.

The four processing units 18 each include a toner bin 20 that stores colored toner (an example of consumable print materials), typically black K, yellow Y, magenta M, or cyan C toners, and a photosensitive drum 21. In the printing process, the light-emitting unit 17 irradiates the circumferential surface of the charged photosensitive drum 21 of the respective processing unit 18 to form an electrostatic latent image. Then, toner is supplied to the electrostatic latent image and the image is developed. Sequentially, the toner image is transferred from the respective processing units 18 to the paper sheet 11 carried over the conveyor belt 16. Then, the fuser 19 heats the paper sheet 11 to fuse the toner, and the paper sheet 11 is ejected.

On the printer 10, a readout unit 24 having an auto document feeder (ADF) 24 is provided. The readout unit 24 reads out the document sheet and obtains the readout data. On the front upper surface of the readout unit 24, a display unit 25 and an operation unit 26 are provided. The display unit 25 may include a display, a lamp, or the like and is capable of displaying various setting screens, an operation state of an apparatus, or the like. The operation unit 26 (an example of reception unit and non-facsimile receiver unit) may include a plurality of buttons and is capable of performing an input operation such as user's instructions on implementation of a job, or the like.

Further, the printer 10 includes a pattern sensor 28 for use in a correcting process which will be described later. The pattern sensor 28 is provided below the conveyor belt 16. The pattern sensor 28 receives light emitted to the conveyor belt 16 and for example, detects a pattern formed on a surface of the conveyor belt 16 based on amount of the emitted light.

Electrical Configuration of Printer

Figure 2:
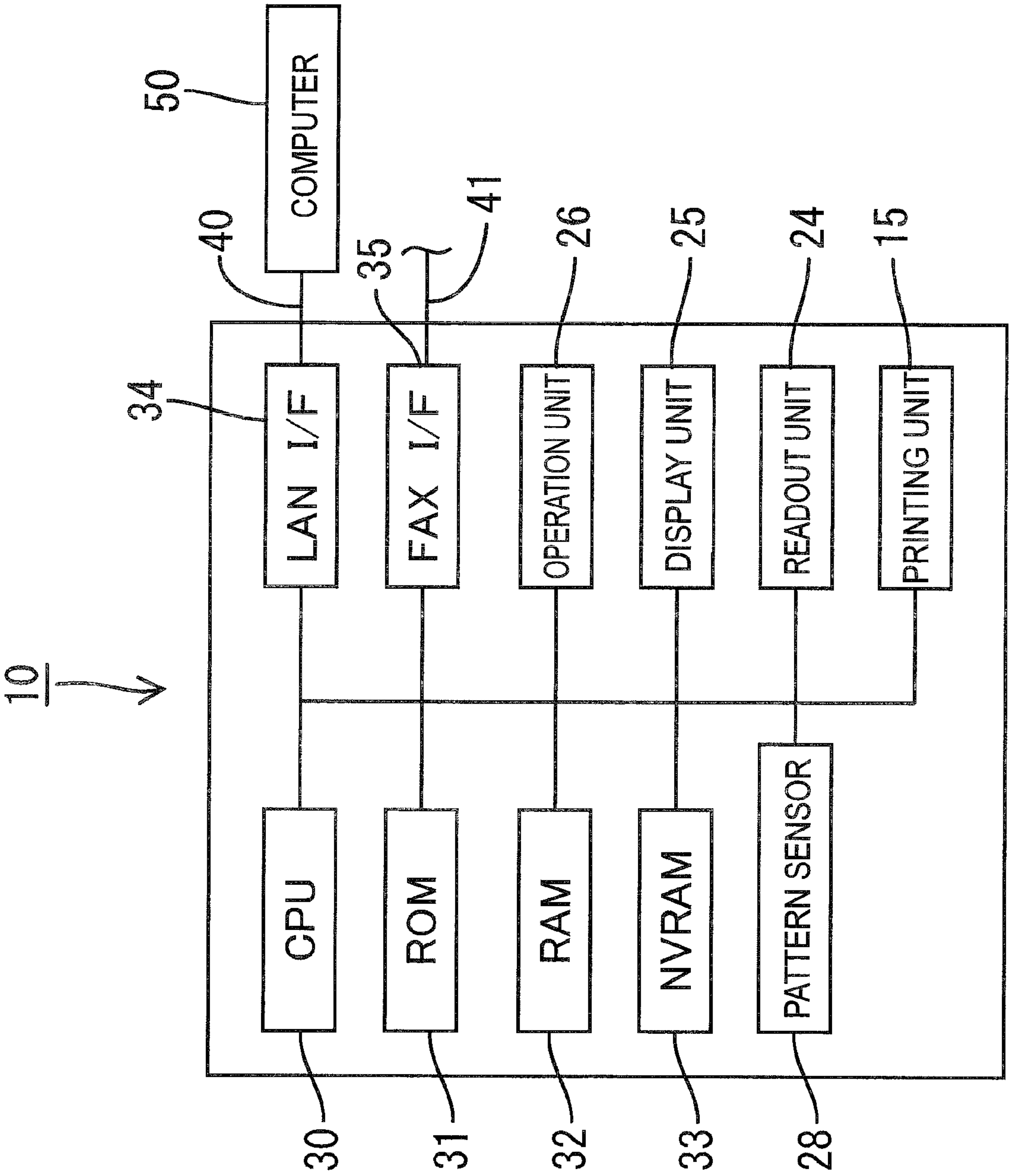
FIG. 2 is a block diagram schematically illustrating an electrical configuration of a printer.

FIG. 2 is a block diagram of an electrical configuration of the printer 10.

The printer 10 includes a CPU 30, a ROM 31, a RAM 32, and a non-volatile RAM (NVRAM) 33, as shown in FIG. 2. The ROM 31 stores therein a program for executing a variety of operations of the printer 10 such as printing, correction-performing processing, or the like, which will be described later. The CPU 30 (an example of a determination unit, a setting unit, a correction unit, a reprinting unit, and a modifying unit) performs various processing operations according to the program readout from the ROM 31, and controls the respective units while storing the processing results in the RAM 32 or NVRAM 33. Such a configuration is electrically connected to the aforementioned printing unit 15, readout unit 24, display unit 25, operation unit 26, pattern sensor 28, and the like.

The printer 10 includes a network interface 34 and a facsimile interface 35. The network interface 34 (an example of reception unit and non-facsimile receiver unit) is connected to an external computer 50 or the like via a data line 40. Therefore, the printer 10 and the external computer 50 or the like are able to data-communicate with each other. The facsimile interface 35 (an example of reception unit and facsimile receiver unit) is capable of transmitting and receiving facsimile data to or from an external facsimile device (not shown) via a telephone line 41.

Print-Correction Controlling Process

Figure 3:
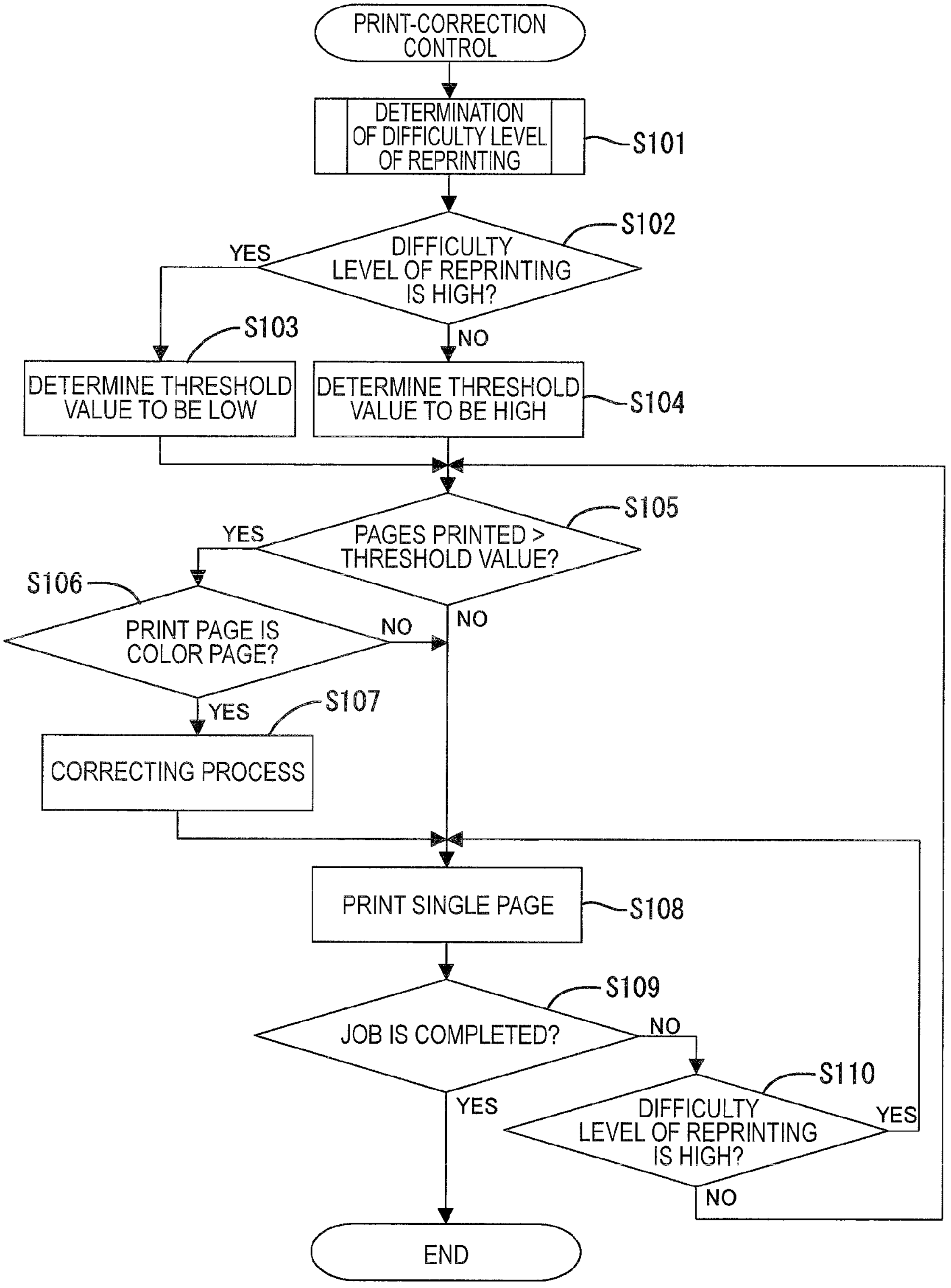
FIG. 3 is a flow chart illustrating a procedure of a print-correction controlling process.
Figure 4:
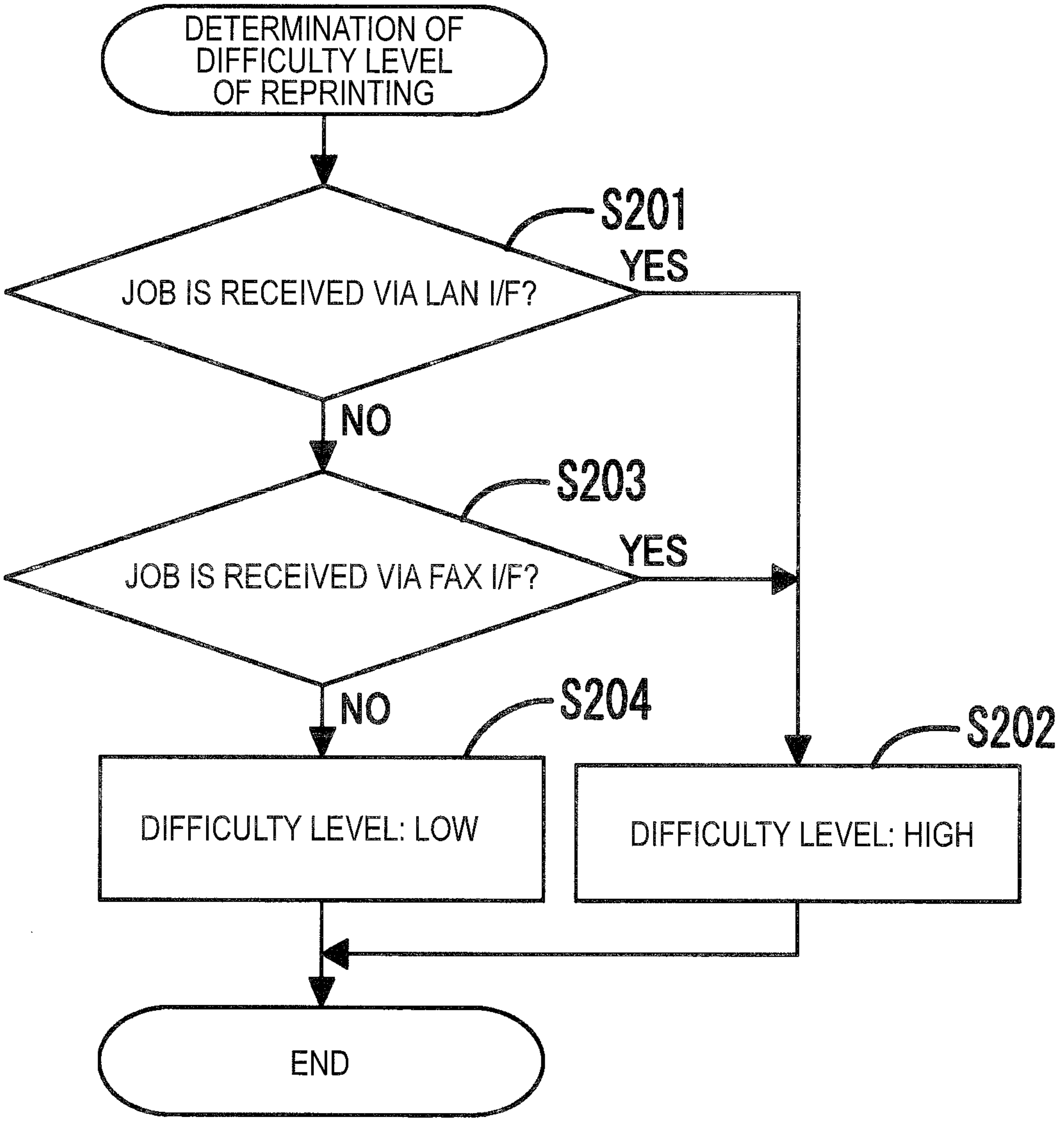
FIG. 4 is a flow chart illustrating a procedure of a process to determine difficulty level to perform reprinting.
Figure 5:
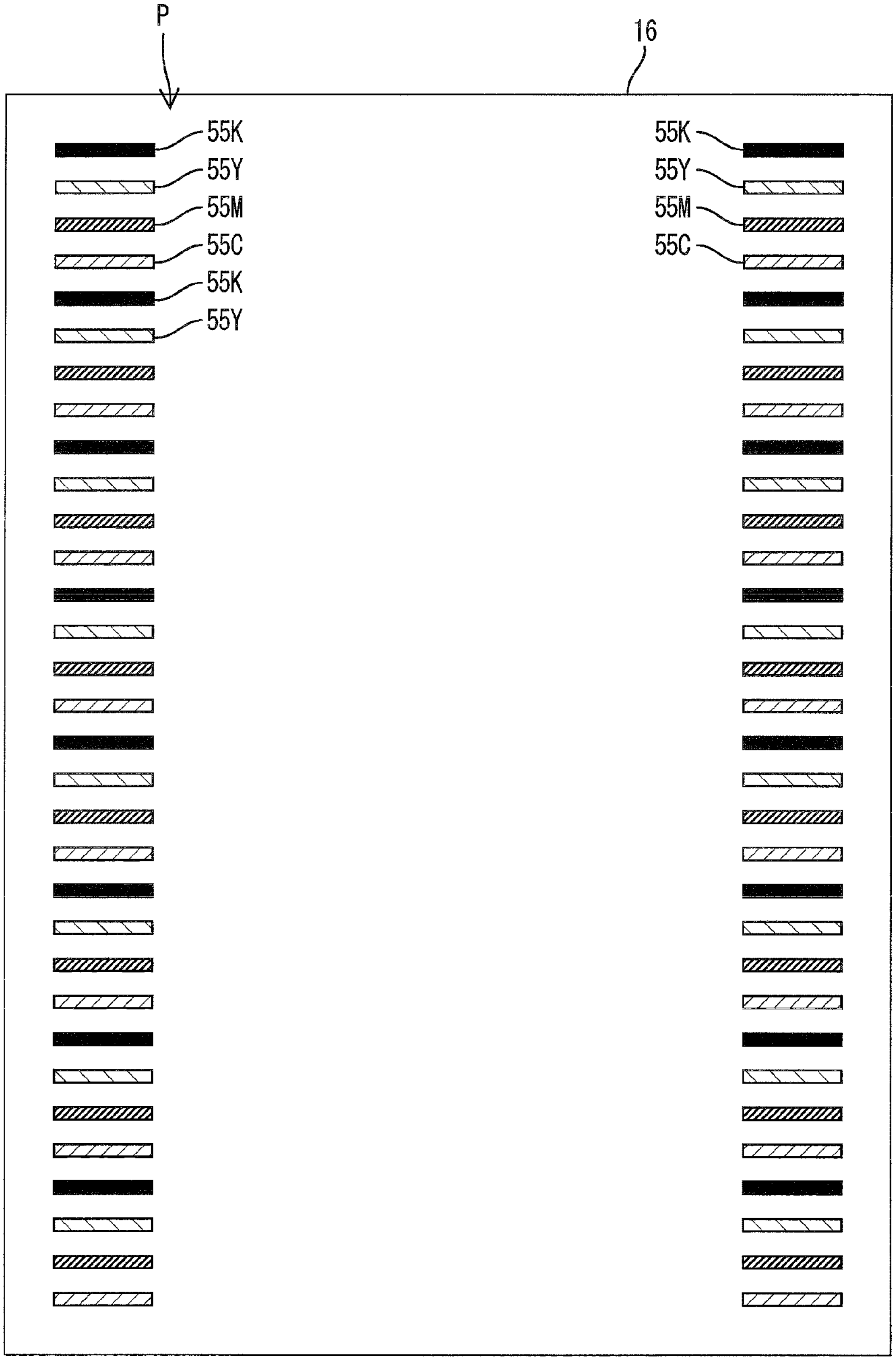
FIG. 5 is a plan view illustrating a pattern for a correcting process.

FIG. 3 is a flow chart of a procedure of a print-correction controlling process, FIG. 4 is a flow chart of a procedure of a process to determine difficulty level to perform reprinting, and FIG. 5 is a plan view of a pattern for correcting process.

As an example of a job including a printing process, the printer 10 can execute three kinds of printing jobs, such as PC printing, copying, and facsimile-receiving. These printing jobs are executed based on execution commands inputted from exterior and respectively have a different command-input route. That is, the execution command for PC printing is transmitted from e.g. a computer 50 and is input from the network interface 34. The execution command for copying is input from the operation unit 26. The execution command for facsimile-receiving is input from the facsimile interface 35.

When being powered and being ready to receive a job, the CPU 30 waits for receipt of the execution command for a printing job at any one of the operation unit 26, the network interface 34, and the facsimile interface 35. When the printing job is received, the print-correction controlling process shown in FIG. 3 starts.

The print-correction controlling process is for controlling the execution of the printing job and the correcting job. When the print-correction controlling process begins, the CPU 30 first executes a process to determine difficulty level of reprinting (S101). In this process, the difficulty level of performing reprinting after the printing job is completed is determined. The difficulty level is a value for evaluating troublesomeness or difficulty for reprinting.

In the present exemplary embodiment, whether the difficulty level of reprinting becomes a high or low level is determined based on the route via which the printing job is input. As shown in FIG. 4, in determining the difficulty level of reprinting, if the printing job is received via the network interface 34 (S201: Yes), the CPU 30 determines the difficulty level of reprinting to be a high level (S202). Further, if the printing job is received via the facsimile interface 35 (S203: Yes), the CPU also determines the difficulty level of reprinting to be a high level (S202). Meanwhile, if the printing job is received via the operation unit 26 (S203: No), the CPU determines the difficulty level of reprinting to be a low level (S204).

The above-described determination is conducted based on following conditions. If the printing job is received via the network interface 34, there is a possibility that a user commanding the printing (PC print) is at a place where the computer 50 is installed, and the place may be slightly distant from a place where the printer 10 is located. Thus, after the user transmits commands for executing the printing job, the user has to go to the place where the printer 10 is located in order to check the printing result, and if the user determines that reprinting is needed, the user needs to return to the place where the computer 50 is installed and repeat the preceding processes.

Meanwhile, if the printing job is received via the operation unit 26, the user is likely to be near the printer 10. Therefore, it is easy for the user to check the printing result and command reprinting. Furthermore, if the printing job is received via the facsimile interface 35, a user who transmits a command for executing a printing job may be at a place far away from the place where the printer 10 is located. Therefore, reprinting may be more difficult to perform than the case where the printing job is received via the network interface 34.

After determining the difficulty level in S101 of FIG. 3, the CPU 30 subsequently executes setting of a correction-performing condition based on the determination result. The correction-performing condition is a condition for determining whether to perform a correcting process or not, which will be described later. In the present exemplary embodiment, the correction-performing condition is regarded to be satisfied if the number of pages printed after a previous correcting process reaches a threshold value. The threshold value may be set to either a high number or a low number. If the difficulty level of reprinting is high (S102: Yes), the CPU 30 sets the threshold value to the low number (S103). If the difficulty level of reprinting is low (S102: No), the CPU sets the threshold value to the high number (S104). Thus, if the difficulty level of reprinting is high, the correction-performing condition is more easily satisfied than if the difficulty level of printing is low. The correction-performing condition may be modified adequately. For example, the correction-performing condition may be satisfied if a time lapse or a temperature change from a previous correcting process reaches a threshold value.

Subsequently, the CPU 30 determines whether or not the number of pages printed from the previous correcting process reaches the threshold value, i.e. whether or not the correction-performing condition is satisfied (S105). If the number of pages printed is larger than the threshold value, i.e. if the correction-performing condition is satisfied (S105: Yes), the CPU subsequently determines whether or not the next page to be printed is a color page (S106). If the page is a color page (S106: Yes), the correcting process is performed (S107).

Hereinafter, the correcting process is exemplified as position correction that is performed for correcting a positioning gap of an image-forming position. When the correcting process begins, the CPU 30 forms a pattern P, shown in FIG. 5, on the conveyor belt 16, using the printing unit 15. This pattern P is composed of two rows of thin, long marks 55K, 55Y, 55M, and 55C of different colors, wherein in each row, a plurality of mark sets are arranged spaced in a sub-scan direction, each mark set including four marks 55K to 55C arranged in the order of black, yellow, magenta, and cyan.

Subsequently, the CPU 30 measures timing when the respective marks 55K to 55C of each mark set pass through a detection position of the pattern sensor 28. According to the measured result, the CPU 30 obtains an amount of the positioning gap in the sub-scan direction, for each different color (called corrected color) marks 55Y, 55M, and 55C, relative to the black mark 55K. Then, the CPU calculates an average value of the amount of the positioning gap among the respective corrected colors, for each of the respective mark sets, and calculates a corrected value to offset the average value of the positioning gap, and stores the corrected value in the NVRAM 33, and completes the correcting process.

Meanwhile, the user can input an execution command for correction via the computer 50 in connection with the operation unit 26 or the network interface 34, and upon receipt of the correction execution command, the CPU 30 performs the correcting process irrespective of whether the correction-performing condition is satisfied or not.

After completing the correcting process in S107 of FIG. 3, the CPU 30 executes a printing process where the printing unit 15 prints a single page of the printing job (S108). During the execution of the printing job, the CPU 30 performs the correction of the position of an image by reading out the corrected value stored in the NVRAM 33 during the correcting process, and by supplying, to the printing unit 15, print data, the print position of which is corrected based on the corrected value.

Meanwhile, if the number of print pages is determined to be below the threshold value in S105 (S105: No), or that the print page is monochrome in S106 (S106: No), the CPU 30 executes a printing process of printing a single page of the printing job in S108, without executing the correcting process. The process may be configured such that, the processing of determining whether the print page is a color page in S106 is omitted, and the correcting process is always performed if the number of print pages is larger than the threshold value (the case that the correction-performing condition is satisfied).

Subsequently, the CPU 30 determines whether or not the targeted printing job has been completed (S109). If it is determined that the targeted printing job has not been completed (S109: No), whether or not the difficulty level of reprinting has been determined to be a high level in the process of S101, is determined (S110). If the difficulty level of reprinting is determined to be a high level (S110: Yes), the process returns to S108 and printing of a next page is performed. Meanwhile, if the difficulty level of reprinting is determined to be a low level (S110: No), the process returns to S105 and the correction-performing condition is determined. The CPU 30 completes the print-correction controlling process if all pages of the printing job have been printed out (S109: Yes).

That is, in the print-correction controlling process, if the difficulty level of reprinting of certain pages of the printing job is determined to be a low level, whenever a page is printed, the process of S105 of determining the correction-performing condition is executed. Therefore, the correcting process may be performed during printing. Meanwhile, if the difficulty level of reprinting is determined to be a high level, the correcting process may be executed only at the time before a first page is printed. Therefore, no correcting process is executed during printing.

Effects of the First Exemplary Embodiment

According to the above-described first exemplary embodiment, the difficulty level of reprinting is determined based on via which unit among the operation unit 26, the network interface 34, and the facsimile interface 35, has the printing job been received, and as the difficulty level increases, the correction-performing condition is more easily satisfied. In other words, the difficulty level to satisfy the correction-performing condition varies according to an input route of a printing job.

It is considered that the troublesomeness for a user checking the printed image and performing reprinting varies depending on whether the place where the printing job is input is close to the printer 10 or not. Thus, the difficulty level of reprinting is determined based via which reception unit has the printing job been received. As the difficulty level increases, the correcting process is made easier to perform, and to the contrary, as the difficulty level decreases, the correction process is made difficult to perform. Accordingly, frequency of performing the correcting process can be restricted, and a need to perform a troublesome reprinting is reduced, resulting in improvement in convenience for the user.

Further if the printing job is received via facsimile communication, the difficulty level of reprinting is determined to be higher than the difficulty level of reprinting when the printing job is received via other unit. Thus, if the printing job is received via facsimile reception, the correction-performing condition is set so as to be more easily satisfied than other cases, and the correcting process is more easily performed. In order to perform reprinting of the facsimile received printing job, a user needs to request re-transmission to a sender, and thus, in many cases, it is relatively troublesome or difficult to perform the reprinting. By the correcting process being performed more easily when the printing job is received via facsimile communication, occurrence of such a need is avoided.

Further, if the correcting process is performed during the execution of the printing job, an image quality may vary before and after the correcting process, and may result in deterioration of visual quality. According to the above-described embodiment, if the difficulty level of reprinting is higher than a reference value, no correcting process is performed during printing, and thus, the deterioration of visual quality due to change in image quality can be prevented. Further, if the difficulty level of reprinting is lower than a reference value, the correcting process is performed during printing, and thus, a high image quality can be ensured. Even when a user determines that reprinting is needed due to change of image quality, reprinting can be easily performed.

Monochrome printing is considered to have less influence on a positioning gap or a density gap, compared to color printing. Thus, if the printing job is monochrome printing, even when the correction-performing condition is satisfied, no correcting process is performed, thereby restricting performing frequency of the correcting process together with an influence on an image quality.

Further, the process may be configured so that the processing of S201 is omitted, and the CPU only determines whether or not a printing job is received via the facsimile interface 35 in S203, and if it is received via the facsimile interface 35 (S203: Yes), the difficulty level is determined to be high (S202).

That is, if a printing job is received via facsimile communication, the correction-performing condition is more easily satisfied than other cases where the printing job is received via other unit. Since reprinting of the printing job received via facsimile communication is relatively troublesome or difficult, by the correcting process being performed more easily when the printing job is received via facsimile communication, occurrence of need of such a reprinting is avoided.

Second Exemplary Embodiment

The second exemplary embodiment of the present invention will now be described with reference to FIG. 6.

Figure 6:
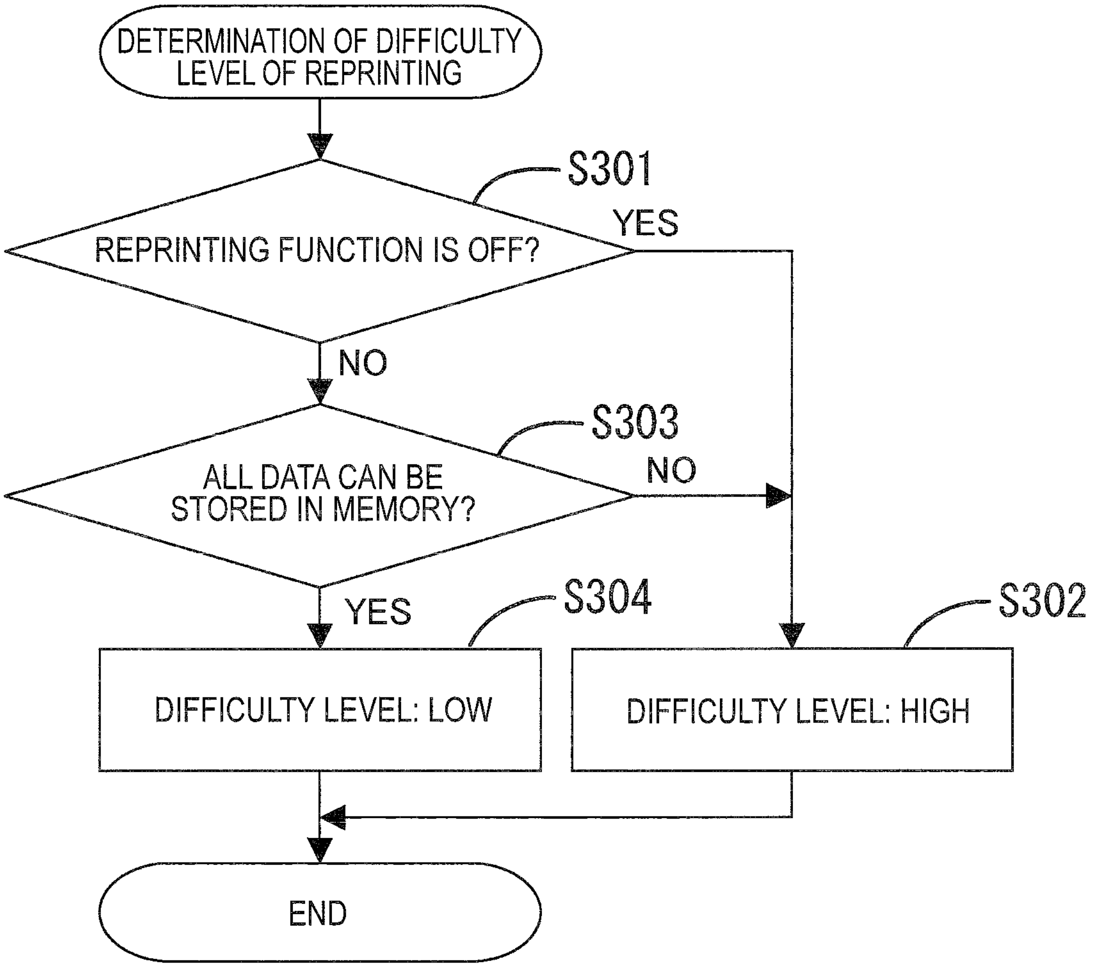
FIG. 6 is a flow chart illustrating a process to determine difficulty level to perform reprinting according to a second exemplary embodiment of the present invention.

FIG. 6 is a flow chart of a procedure of a process to determine difficulty level of reprinting. The second exemplary embodiment has the same basic configuration of the printer 10 and the same print-correction controlling process as those of the first embodiment, except that the process to determine the difficulty level of reprinting replaces that of the first exemplary embodiment.

The printer 10 of the present embodiment has a reprinting function that makes it possible to easily perform reprinting. The reprinting function can be set to ON (available state) or OFF (unavailable state) according to commands from the operation unit 26. If the reprinting function is available, the CPU 30 stores print data used in printing (the print data unit original raw data or data processed for printing) in the RAM 32, for a certain period after the printing is completed, whenever printing is performed. When a user checks the printing result and determines reprinting is needed, the user commands performing reprinting. Thereby, the CPU 30 reads out the aforementioned data from the RAM 32 and performs reprinting (reprinting process). Thus, by use of the reprinting function, a user can reduce time to input the same data again to the printer 10.

In the process of FIG. 6 of determining the difficulty level of reprinting, the CPU 30 determines whether the reprinting function is in an OFF state or not (S301), and if it is in the OFF state (S301: Yes), the CPU determines the difficulty level of reprinting to be high (S302). Meanwhile, if the reprinting function is in an ON state (S301: No), the CPU determines whether all data of a printing job can be stored in the RAM 32 or not (S303). If an amount of data of the printing job is unknown, the process may be configured such that the amount of data is estimated from a number of pages of the printing job, and whether an area for storing the data can be secured in the RAM 32 or not may be determined. Instead of using the amount of data, if the RAM 32 has a certain amount of empty storage space, it may be determined that the data can be stored in the RAM 32. Meanwhile, even if the reprinting function has been set to an ON state, if all of the data of the printing job were unable to be stored in the RAM 32 during printing, the reprinting function cannot be performed.

When the area for storing all data of the printing job cannot be ensured in the RAM 32 (S303: No), the CPU 30 determines the difficulty level of reprinting to be high in S302, and when there is an empty storage space in the RAM (S303: Yes), the CPU determines the difficulty level to be low (S304). Thus, when the reprinting function is in an OFF state, or there is no sufficient empty storage space in the RAM 32, the difficulty level is determined to be high, so that the correction-performing condition is easily satisfied.

According to the above-described exemplary embodiment, if the reprinting cannot be performed, the difficulty level of reprinting is determined to be higher than if the reprinting can be performed. The correction-performing condition becomes easier to satisfy as the difficulty level of reprinting increases. In other words, if reprinting cannot be performed, the correction-performing condition becomes easier to satisfy than when the reprinting can be performed.

That is, if the reprinting process can be performed, the correcting process is made difficult to perform, thereby restricting frequency in performance of the correcting process. Further, if the reprinting process cannot be performed, the correcting process is made easier to be performed, thereby reducing needs for performing troublesome reprinting, which improves the convenience for the user.

Third Exemplary Embodiment

Figure 7:
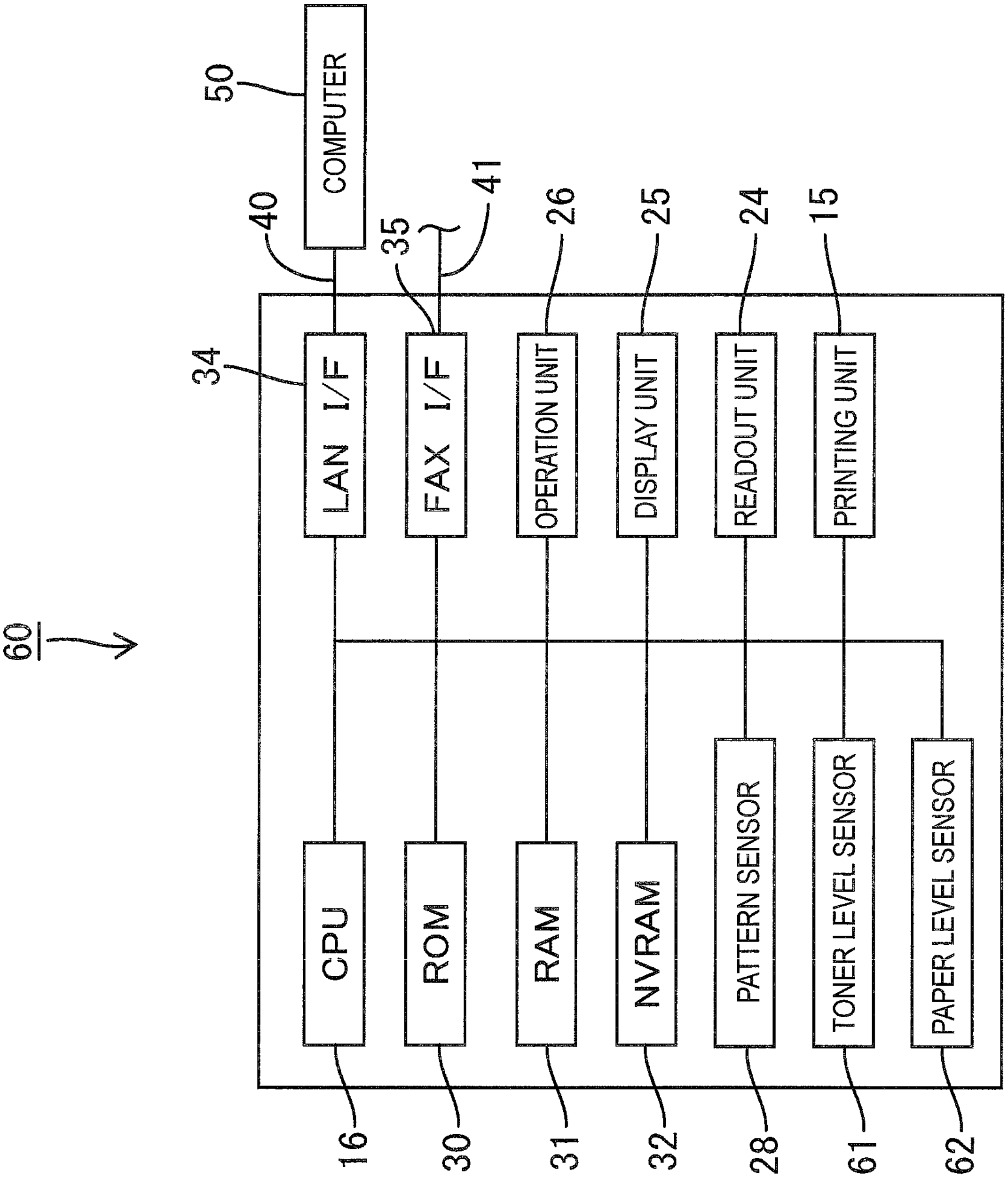
FIG. 7 is a side cross-sectional view illustrating the schematic configuration of a printer according to a third exemplary embodiment of the present invention.

The third exemplary embodiment of the present invention will now be described with reference to FIGS. 7 and 8. FIG. 7 is a block diagram illustrating the schematic configuration of a printer 60, and FIG. 8 is a flow chart illustrating a process to determine difficulty level to perform reprinting.

The printer 60 of the present exemplary embodiment includes a toner level sensor 61 and a paper level sensor 62, in addition to the configuration of the printer 10 of FIG. 2. The other configuration of the printer 60 is identical to that of FIG. 2. The content of the print-correction controlling process is also equal to that of the first exemplary embodiment.

The toner level sensor 61 (an example of a detecting unit) transmits light to the toner bin of the respective processing unit 18 and detects the remaining amount of toner based on the amount of transmitted light. The paper level sensor 62 (an example of a detecting unit) brings an actuator into contact with an upper surface of a sheaf of papers stacked in a feed tray 12 and detects the remaining amount of the papers 11 based on a position of the actuator.

Figure 8:
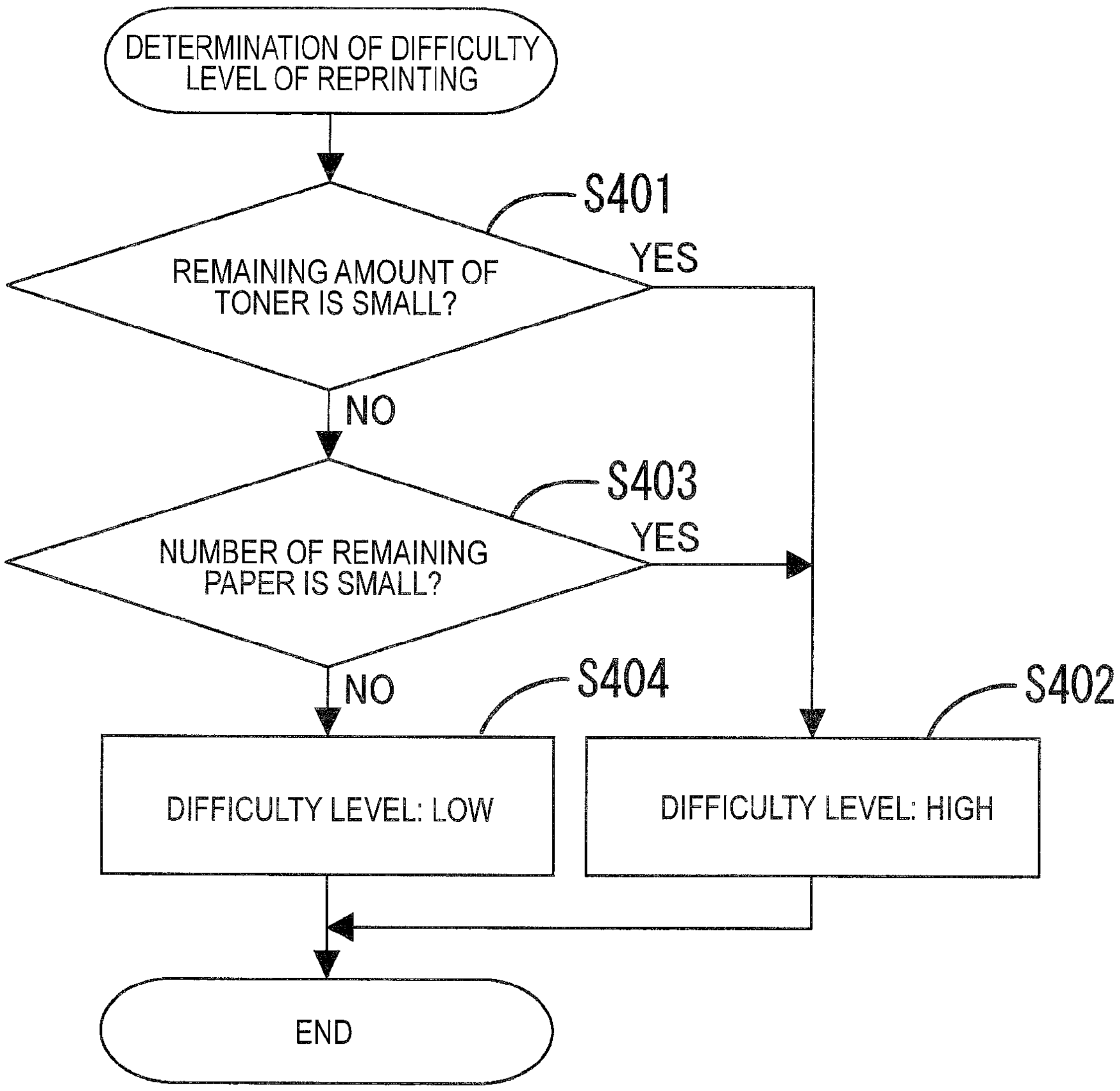
FIG. 8 is a flow chart illustrating a process to determine difficulty level to perform reprinting according to the third embodiment of the present invention.

In the process of FIG. 8 of determining the difficulty level of reprinting, the CPU 30 determines whether or not the remaining amount of toner is equal to or less than a predetermined reference value based on the detecting result by the toner level sensor 61 (S401), and if the remaining amount is equal to or less than the reference value (S401: Yes), the CPU determines the difficulty level of reprinting to be high (S402). Meanwhile, if the remaining amount of toner exceeds the reference value (S401: No), the CPU determines whether or not the remaining amount of papers is equal to or less than a predetermined reference level based on the detecting result by the paper level sensor 62 (S403). If the remaining amount of papers is equal to or less than the reference value (S403: Yes), the difficulty level of reprinting is determined to be high (S402), and if the remaining amount of papers exceeds the reference value (S403: No), the difficulty level is determined to be low (S404).

According to the above-described embodiment, as the remaining amount of toner or paper 11, which are consumable print materials, decreases, the difficulty level of reprinting is determined to be high. As the difficulty level increases, the correction-performing condition is subject to being satisfied. In other words, the correction-performing condition becomes easier to satisfy as the amount of consumable print materials remaining decreases.

That is, if the remaining amount of consumable print materials is low, when performing reprinting, it is likely that the consumable print material becomes insufficient, and the user is likely to perform a troublesome process of supplying the consumable print material. Thus, in case that the remaining amount of consumable print materials is low, the correcting process is made easier to perform, thereby reducing the need for performing a troublesome reprinting process. Additionally, if the remaining amount of consumable print materials is sufficient, the correcting process is made difficult to perform, thereby restricting frequency in performance of the correcting process. Thereby, the convenience for the user is improved.

Reference Embodiment

The invention may be configured as follows:

In the printer 10 of FIG. 2, a user registers, via the operation unit 26 or the like, corresponding information in advance, which is information obtained by matching user information (a user name, a computer name, etc) with the difficulty level of satisfying a correction-performing condition, and the CPU 30 stores the corresponding information in the NVRAM 33 or the like. Then, upon receipt of a printing job, the CPU 30 specifies the user who input the printing job.

Specifically, for example, if the printing job is transmitted from a computer, a user name, a computer name, or the like may be attached to an execution command for the printing job. Further, if the printing job is input from the operation unit 26, an authentication unit such as a card key or the like may be provided in the printer 10 so that a user name may be taken by authentication. Then, the CPU 30 sets a correction-performing condition corresponding to a specified user based on the above-mentioned corresponding information. Thus, the correction-performing condition can be changed based on the user.

Moreover, a following exemplary embodiment may be realized by combination of the reference embodiment with the invention.

For example, registration is done in advance for every user on whether or not he/she is allowed or disallowed to use a reprint function, and if a printing job is input by a disallowed user, the correction-performing condition becomes easier to satisfy than when the printing job is input by an allowed user.

Registration is done for every user on whether a place where a seat or a computer exists is close to or far away from a printer, and if a printing job is input by a far user, the correction-performing condition becomes easier to satisfy than when the printing job is input by a close user.

Other Exemplary Embodiments

The present invention is not limited to the aforementioned exemplary embodiments. For example, following exemplary embodiments may be involved within the technical scope of the present invention.

(1) The above-described exemplary embodiments described an example that the invention is adapted to an electrophotographic color printer. However, the present invention may also be applicable to e.g. printing apparatuses for monochrome printing only, or an ink-jet type printing apparatus or other type printing apparatuses. Further, as print agents, ink or the like may be used other than toner.

(2) The above-described exemplary embodiments described the correcting process that corrects relative positioning gap between the respective colors. However, the present invention may be configured, for example, so that periodic gap of an image forming position due to heterogeneous rotation of e.g. a photosensitive drum or a belt is measured, with the result that record timing upon exposure is adjusted thereby correcting the periodic gap. Furthermore, the correcting process may be performed such that non-uniformity of a density of an image is measured and corrected.

(3) The procedure of the respective flow chart may be modified without departing from the scope of the invention, so that for example, a portion of the procedure may be omitted or combined, or a portion of a condition may be changed. For example, the difficulty level may be determined in, either of S201 or S203 of FIG. 4, either of S301 or S303 of FIG. 6, or either of S401 or S403 of FIG. 8, or otherwise the difficulty level may be determined by combination of these processes.

(4) The above-described exemplary embodiments have described that the difficulty level has two levels. However, according to the present invention, the difficulty level may be of three or more levels and the correction-performing condition may be changed accordingly. For example, the process may be configured such that the difficulty level is divided into three-stage level, i.e. high, middle, and low, and if an input source of a printing job is a facsimile, an external computer, or an operation unit, the difficulty level is determined to be high, middle, or low, respectively, so that the correction-performing condition may vary in three levels where the condition is satisfied easier as the difficulty level becomes higher.

(5) The above-described exemplary embodiments have described that if difficulty level of reprinting is high, no correcting process is performed during printing. However, according to the present invention, even in high difficulty level, the correcting process may be performed during printing. By this performance, high image quality can be ensured.

(6) The above-described exemplary embodiments have described that three kinds of printing jobs, including PC printing, copying, and fax-receiving, can be performed. However, according to the present invention, the printing jobs capable of being performed may be changed arbitrarily. The printing job may be configured such that e-mail printing can performed, in a manner that e-mail is received from a mail server on the Internet via the network interface, and an image attached thereto is printed. Further, direct printing, wherein an USB interface or other media connector is provided as a reception unit so that when a media such as flash memory is connected to the media connector, image data stored in the media is read out and printed, may also be capable of being performed. Meanwhile, the e-mail printing may be considered to have higher difficulty level of reprinting than that of the printing job input via the operation unit, and the direct printing may be considered to have relatively low difficulty level of reprinting, similar to the printing job from the operation unit.

What is claimed is:

1. A printing apparatus comprising:

a reception unit configured to receive a printing job;

a printing unit configured to print based on the print job received by the reception unit;

a processor; and a memory storing instructions, when executed by the processor, causing the printing apparatus to:

determine whether a reprinting function is set or not, wherein, when the reprinting function is set, the printing job printed by the printing unit is stored in the memory and is reprinted by the printing unit based on a command from a user;

set a threshold for determining whether a correction-performing condition is satisfied, wherein a first threshold is set when the reprinting function is not set, and a second threshold is set when the reprinting function is set, the first threshold being less than the second threshold;

when the reprinting function is not set, determine whether a current printing-related value, which is related to the printing, has reached the first threshold;

if the current printing-related value has reached the first threshold during execution of the print job, perform a correcting process including:

causing the printing unit to form a pattern on a medium; measuring the pattern formed on the medium; and correcting, based on the received printing job, the image to be printed in accordance with a measurement result of the pattern, and cause the printing unit to print the image corrected by the correcting process;

if the current printing-related value has not reached the first threshold during execution of the print job, cause the printing unit to print the image without performing the correcting process; and when the reprinting function is set, determine whether a current printing-related value, which is related to the printing, has reached the second threshold;

if the current printing-related value has reached the second threshold during execution of the print job, perform a correcting process including:

causing the printing unit to form a pattern on a medium; measuring the pattern formed on the medium; and correcting, based on the received printing job, the image to be printed in accordance with a measurement result of the pattern, and cause the printing unit to print the image corrected by the correcting process;

if the current printing-related value has not reached the second threshold during execution of the print job, cause the printing unit to print the image without performing the correcting process.

2. A printing apparatus comprising:

a reception unit configured to receive a printing job;

a printing unit configured to print based on the print job received by the reception unit and configured to perform both color printing and monochrome printing;

a processor; and a memory storing instructions, when executed by the processor, causing the printing apparatus to:

determine whether a reprinting function is set or not, wherein, when the reprinting function is set, the printing job printed by the printing unit is stored in the memory and is reprinted by the printing unit based on a command from a user;

set a threshold for determining whether a correction-performing condition is satisfied, wherein a first threshold is set when the reprinting function is not set, and a second threshold is set when the reprinting function is set, the first threshold being less than the second threshold;

when the reprinting function is not set, determine whether a current printing-related value, which is related to the printing, has reached the first threshold;

if the current printing-related value has reached the first threshold during execution of the print job and if the printing job is for the color printing, perform a correcting process including: causing the printing unit to form a pattern on a medium; measuring the pattern formed on the medium; and correcting, based on the received printing job, the image to be printed in accordance with a measurement result of the pattern, and cause the printing unit to print the image corrected by the correcting process;

if (i) the current printing-related value has not reached the first threshold during execution of the print job, or (ii) if the printing job is for the monochrome printing while the current printing-related value has reached the first threshold during execution of the print job, cause the printing unit to print the image without performing the correcting process; and when the reprinting function is set, determine whether a current printing-related value, which is related to the printing, has reached the second threshold;

if the current printing-related value has reached the second threshold during execution of the print job and if the printing job is for the color printing, perform a correcting process including; causing the printing unit to form a pattern on a medium; measuring the pattern formed on the medium; and correcting, based on the received printing job, the image to be printed in accordance with a measurement result of the pattern, and cause the printing unit to print the image corrected by the correcting process;

if (i) the current printing-related value has not reached the second threshold during execution of the print job, or (ii) if the printing job is for the monochrome printing while the current printing-related value has reached the second threshold during execution of the print job, cause the printing unit to print the image without performing the correcting process.

* * * * *